June 8, 1965  R. H. ANDERSON  3,187,399
FASTENING DEVICE
Filed Sept. 3, 1963

INVENTOR
ROY H. ANDERSON
BY
*Barlow & Barlow*
ATTORNEYS

3,187,399
FASTENING DEVICE
Roy H. Anderson, Cranston, R.I., assignor to Felch-Anderson Co., a corporation of Rhode Island
Filed Sept. 3, 1963, Ser. No. 306,156
1 Claim. (Cl. 24—206)

This invention relates to an improvement in fasteners, more particularly to a fastener in which one part overlaps the other part. More particularly, the fastening device comprises a stud member to be fixed to one part and a socket member to be fixed to the other part with the stud member of a size to enter the socket member and protrude therethrough with a third detachable member to enter the stud member after it has protruded through the socket member and serve as a means to prevent the stud member from being withdrawn from the socket member. Fastening devices of this general type are useful in such fields as fastening flaps of handbags, shoe buckles, delivery pouches and the like.

Figure 1:
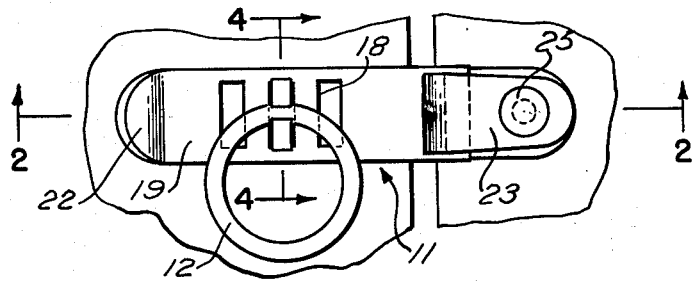
FIG. 1 is a plan view of the invention in assembled relationship.
Figure 2:
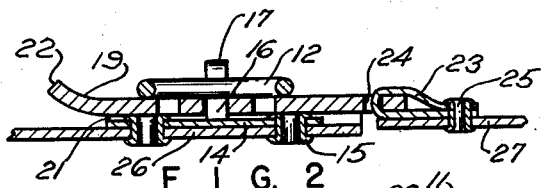
FIG. 2 is a central sectional view taken on line 2—2 of FIG. 1.
Figure 3:
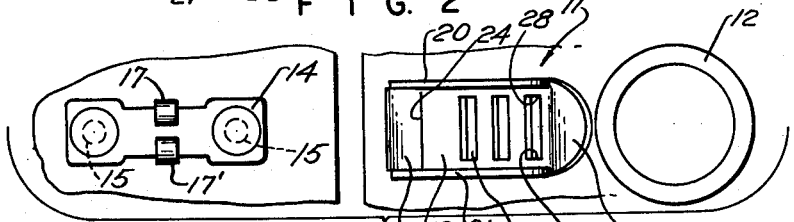
FIG. 3 is a plan view showing the fastener in open position.

The fastening device of this invention comprises two basic parts; namely a stud member 10 and a socket member 11 and in this particular case includes a keeper member 12. The stud member 10 consists of a backing plate 14 which is provided with one or more fastening rivets 15, extending therefrom; and rising from two opposite sides of this plate member 14 are a pair of arms 16 and 16'. These arms together form generally a spring means and both of the arms have enlarged tip portions 17 and 17', which in the illustrated form, are ends that are rolled from the main body of the arms 16 and 16'.

Figure 4:
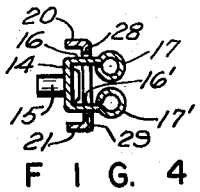
FIG. 4 is a sectional view on line 4—4 of FIG. 1 with the keeper ring omitted.
Figure 5:
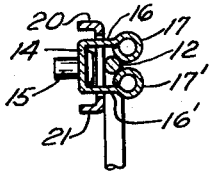
FIG. 5 is a sectional view on line 4—4 of FIG. 1.

The socket member generally designated 11 consists of a plate-like portion having a series of rectangular openings or apertures 18 in a plate-like member 19 which has two edges thereof turned downwardly to provide a channel-like trough section as best seen in FIGS. 4 and 5.

The plate member 19 has an end 22 bent away from the general plate thereof that is to provide a grasping portion while the opposite end is provided with hinging means which in the instant case consist of a strap 23 that passes through an aperture 24 in the plate 19, the strap parts 23 being adapted to be fastened together by a rivet means 25.

The arrangement described thus far may be assembled upon two adjacent flaps 26 and 27 which are adapted to be joined, the stud member 10 being fastened by the means 15 to the flap 26 while the strap 23 is fastened by rivet means 25 to flap 27 in a fashion whereby the plate 19 will normally overhang the flap 26 and the stud member 10. Depending upon the relative position of the parts, one of the apertures 18 may be forced over the spring arms 16 and 16', which will spring inwardly upon engagement of the edges 28 and 29 of the apertures 18. After the edges 28 and 29 have passed the enlarged top portion 17 and 17', the resiliency of the arms 16 and 16' will spring the stud member back into normal position and hold the socket member in seating relationship as shown in FIG. 4.

To insure that the socket member does not become disengaged, from the stud member, a keeper means, generally designated as 12 and shown in the drawings specifically as a ring, is provided with a cross section larger than the space normally existing between the inner surfaces of the enlarged ends 17, 17'. This ring 12 is thereupon pressed between the ends 17, 17' into the position as shown in FIG. 5 where it will abut the top surface of the plate 19 and it will also remain engaged with the inner surfaces of the enlarged tip portion 17, 17'. In this position, it will be impossible to lift the plate 19 away from the stud member 10 since the presence of the keeper 12 will not permit the arms 16 and 16' to flex inwardly towards each other. To disengage the fastener, it is merely necessary to remove the keeper 12 and place one's finger underneath the lifting part 22 whereupon the parts 10 and 11 of the fastener member will become easily disengaged.

I claim:

A fastening device for a pair of flaps comprising a sheet metal plate having the sheet stock thereof bent therefrom to form a spring stud member having at least a pair of opposed spring arms rolled into cylindrical shape to form enlarged tip portions having internal shoulders, said stud member having fastening means for fastening to the one flap, a socket member having an opening defined by at least a pair of opposed edges, the enlarged tip portions having larger dimensions than the opposed edges of said opening, the opening of said socket member embracing the spring arms in close relationship, said socket member having fastening means for fastening to the other flap, and separate keeper means engaging the opposed shoulders of the rolled enlarged tip portions, said keeper means being of a size to spread the enlarged tip portions and be urged by said means against the socket member to maintain the arms in spaced relationship and to prevent accidental displacement of the socket member from the stud member when in locked position.

References Cited by the Examiner
UNITED STATES PATENTS

| | | | |
|---|---|---|---|
| 497,710 | 5/93 | Draper | 24—211 |
| 551,406 | 12/95 | Richardson | 24—206 |
| 847,971 | 3/07 | Ritter | 24—166 |
| 1,047,782 | 12/12 | German | 24—211 |
| 1,169,693 | 1/16 | Swedlund | 24—211 |
| 1,714,053 | 5/29 | Stokes | 24—206 |
| 2,004,679 | 6/35 | Tinnerman. | |
| 2,334,268 | 11/43 | Judge | 24—208 |
| 2,940,149 | 6/60 | O'Connor | 24—206 |
| 2,942,905 | 6/60 | Wootton | 292—17 |
| 3,106,759 | 10/63 | Kytta | 24—204 |

DONLEY J. STOCKING, *Primary Examiner.*